(No Model.)

H. M. RITTER.
CASTER.

No. 282,777. Patented Aug. 7, 1883.

WITNESSES
Wm A. Skinkle
Wm Musser

INVENTOR
Henry M. Ritter
By his Attorneys
Pancoast & Pancoast

UNITED STATES PATENT OFFICE.

HENRY M. RITTER, OF COVINGTON, KENTUCKY.

CASTER.

SPECIFICATION forming part of Letters Patent No. 282,777, dated August 7, 1883.

Application filed May 9, 1883. (No model.)

*To all whom it may concern:*

Be it known that I, HENRY M. RITTER, of the city of Covington, in the county of Kenton and State of Kentucky, have invented certain new and useful Improvements in Furniture-Casters, of which the following is a specification.

My invention relates to that class of furniture-casters in which two floor-wheels move freely on an axis passing through a frame, and thus enable the piece of furniture to which the casters are attached to move readily in any direction and at any inclination over an uneven surface. This caster has a frame or housing supporting the axis of the two floor-wheels, which revolve independently. In the upper portion of said frame, upon another axis at right angles to the floor-wheel axis, perpendicularly over the center of and in a plane parallel to the floor-wheel axis, is mounted an anti-friction wheel, upon the exposed portion of the circumference of which rests a plate fastened to the furniture-leg. This plate is secured to a socket extending into the furniture-leg. (Shown as cast in one piece.) In the socket turns freely the stem or spindle of the caster. This stem is pivoted upon an extension of the axis of the anti-friction wheel in an elongated slot provided for this purpose. It oscillates freely upon this axis between the lateral walls of this slot, which insures its being held rigidly perpendicular, and guide and support it against strains lateral to the path of its oscillation. This mode of mounting the stem gives stability and durability with ready adaptation to the inequalities of the floor, and simplicity and economy of construction. There is no irregular play or looseness of the parts. The stem and axle on which it is mounted are adapted to be very cheaply constructed and put together. The stem is enabled to oscillate independent of any other part, the axle is relieved from all leverage strain, and wabbling movements are prevented.

Figure 1:
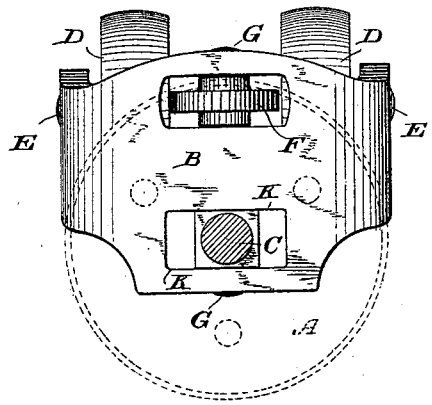
Figure 2:
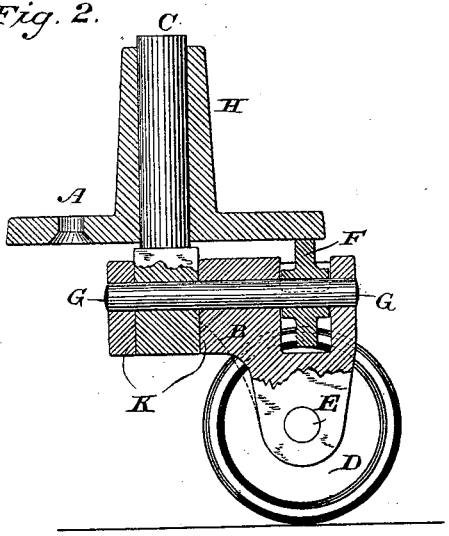
Figure 3:
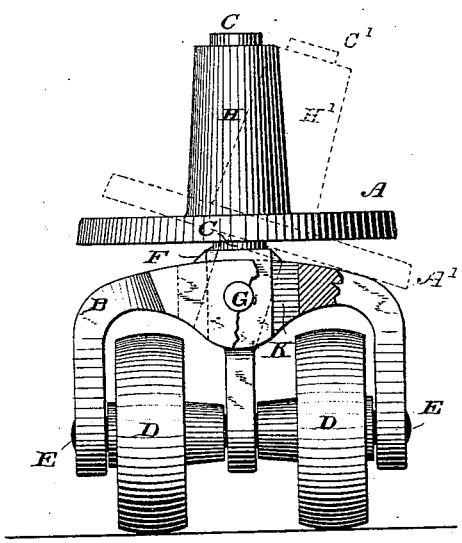
Figure 4:
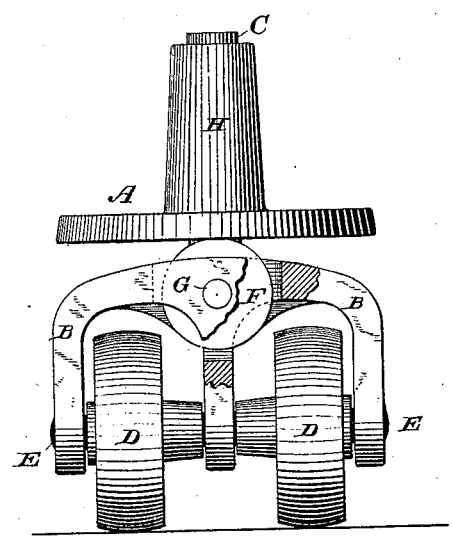

In the accompanying drawings, Figure 1 is a side view. Fig. 2 is a view from above, the plate and socket being removed to show more clearly the slots, in one of which the anti-friction wheel revolves and in the other of which the stem oscillates. Fig. 3 is a front view, showing by means of dotted lines the mode of oscillation; and Fig. 4 is a view of the stem or spindle.

In these figures, A is the plate to which the furniture-leg is firmly attached. H is the socket; C C, the stem or spindle; G G, the axis upon which the stem is pivoted and the anti-friction wheel F revolves. B is the frame or housing which supports the axis E E on which the floor-wheels D D revolve. K K represent the parallel sides of the slot, through which the stem oscillates. In Fig. 3, A', H', and C' represent the position of plate, socket, and stem when the caster is rocked as far as possible to one side.

It will be seen that some of the advantages before described can be obtained by mounting the stem upon a different axis from that of the anti-friction wheel; but this would be inconvenient and less desirable than the arrangement here shown.

I claim—

The combination, in a two-wheeled caster, of a frame having provided therein a longitudinal slot with substantially parallel walls, and a stem having substantially parallel faces mounted upon an axis extending through said slot and guided and supported in its oscillations therein by the contact of its parallel faces with the walls of the slot, substantially as described.

HENRY M. RITTER.

Witnesses:
SAML. H. PERIN,
MELCHERT Z. STANNARD.